(12) United States Patent
Harwood et al.

(10) Patent No.: US 11,669,525 B2
(45) Date of Patent: Jun. 6, 2023

(54) OPTIMIZING WORKFLOW MOVEMENT THROUGH DEVICE ECOSYSTEM BOUNDARIES

(71) Applicant: EMC IP Holding Company LLC, Hopkinton, MA (US)

(72) Inventors: John S. Harwood, Boston, MA (US); Robert Anthony Lincourt, Jr., Franklin, MA (US); William Jeffery White, Plano, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/236,772

(22) Filed: Apr. 21, 2021

(65) Prior Publication Data

US 2022/0342886 A1 Oct. 27, 2022

(51) Int. Cl.
*G06F 16/2453* (2019.01)
*G06F 16/25* (2019.01)
*G06F 11/34* (2006.01)

(52) U.S. Cl.
CPC .... *G06F 16/24549* (2019.01); *G06F 11/3414* (2013.01); *G06F 16/256* (2019.01)

(58) Field of Classification Search
CPC ............... G06F 16/256; G06F 11/3414; G06F 16/24549
See application file for complete search history.

(56) References Cited

U.S. PATENT DOCUMENTS

| 9,356,883 | B1 | 5/2016 | Borthakur |
| 10,996,658 | B1 | 5/2021 | Potts et al. |
| 11,176,534 | B1* | 11/2021 | Pandey ................. G06Q 20/12 |
| 2003/0149685 | A1 | 8/2003 | Trossman et al. |
| 2011/0138147 | A1 | 6/2011 | Knowles et al. |
| 2011/0145318 | A1 | 6/2011 | Krishnamurthy et al. |
| 2014/0223427 | A1 | 8/2014 | Bootland et al. |
| 2016/0075436 | A1 | 3/2016 | Rossano et al. |
| 2016/0162478 | A1 | 6/2016 | Blassin et al. |
| 2016/0300178 | A1 | 10/2016 | Perry et al. |
| 2016/0357241 | A1 | 12/2016 | Ramadoss et al. |
| 2017/0048318 | A1* | 2/2017 | Hebert ..................... G06F 3/06 |

(Continued)

*Primary Examiner* — Dangelino N Gortayo
(74) *Attorney, Agent, or Firm* — Chamberlain, Hrdlicka, White, Williams & Aughtry

(57) ABSTRACT

Techniques described herein relate to a method for optimizing workflow execution. The method may include receiving an event notification at a service controller, wherein the event notification is associated with a workflow deployed in a device ecosystem; performing, based on receiving the event notification, a workflow reconfiguration action comprising: providing a first workflow portion to a first platform controller in a first domain in the device ecosystem; transmitting a workflow reconfiguration action notification to a second platform controller in a second domain of the device ecosystem; identifying, by the second platform controller and in response to receiving the workflow reconfiguration action notification, a data transfer optimization action associated with data to be transmitted from the second domain to the first domain and used during execution of the first workflow portion; and transmitting the data from the second domain to the first domain using the data transfer optimization action.

20 Claims, 6 Drawing Sheets

(56) References Cited

U.S. PATENT DOCUMENTS

| | | | |
|---|---|---|---|
| 2017/0078392 A1* | 3/2017 | Gray | H04L 67/02 |
| 2017/0346683 A1 | 11/2017 | Li | |
| 2018/0255329 A1 | 9/2018 | Gonzalez-banos et al. | |
| 2018/0276044 A1 | 9/2018 | Fong et al. | |
| 2019/0052549 A1 | 2/2019 | Duggal et al. | |
| 2019/0197654 A1 | 6/2019 | Hoppert et al. | |
| 2019/0250996 A1 | 8/2019 | Shiihara | |
| 2019/0354331 A1 | 11/2019 | Neugarten et al. | |
| 2019/0354402 A1* | 11/2019 | Bivens | G06F 9/5077 |
| 2020/0241928 A1 | 7/2020 | Senevirathne et al. | |
| 2020/0401491 A1 | 12/2020 | Mohamed et al. | |
| 2021/0056509 A1 | 2/2021 | Lindy | |
| 2021/0064405 A1 | 3/2021 | Ashkar et al. | |
| 2021/0133622 A1 | 5/2021 | Nidd et al. | |
| 2021/0192535 A1* | 6/2021 | Lee | G06Q 20/389 |
| 2021/0314379 A1* | 10/2021 | Sodagar | H04L 65/80 |
| 2022/0012093 A1* | 1/2022 | Crabtree | G06F 9/5088 |
| 2022/0058556 A1 | 2/2022 | Warake et al. | |
| 2022/0067851 A1 | 3/2022 | Sinha et al. | |
| 2022/0150307 A1 | 5/2022 | Walsh et al. | |

* cited by examiner

OPTIMIZING WORKFLOW MOVEMENT THROUGH DEVICE ECOSYSTEM BOUNDARIES

BACKGROUND

Computing devices often exist in complex ecosystems of devices in which data exists and/or is generated. Such data may be used and/or operated on to produce any number of results. Such operations are often performed by workflows that include any number of services, each using any number of applications, modules, etc. It may be advantageous to deploy all or portions of such workflows within certain portions of the ecosystem of devices. However, as the complexity of such an ecosystem increases (e.g., more data, more devices, etc.), it may become difficult to determine where to deploy the components that comprise the workflows, and how to efficiently do so once an execution environment is determined. Moreover, once deployed, situations may arise that necessitate changes to the execution of a workflow.

SUMMARY

In general, certain embodiments described herein relate to a method for optimizing workflow execution. The method may include receiving an event notification at a service controller of a federated controller of a device ecosystem, wherein the event notification is associated with a workflow deployed in the device ecosystem; performing, by the service controller and based on receiving the event notification, a workflow reconfiguration action comprising: providing a first workflow portion of the workflow and workflow constraints to a first platform controller in a first domain in the device ecosystem; transmitting, by the service controller, a workflow reconfiguration action notification to a second platform controller in a second domain of the device ecosystem; identifying, by the second platform controller and in response to receiving the workflow reconfiguration action notification, a first data transfer optimization action associated with data to be transmitted from the second domain to the first domain and used during execution of the first workflow portion; and transmitting the data from the second domain to the first domain using the first data transfer optimization action.

In general, certain embodiments described herein relate to a non-transitory computer readable medium that includes computer readable program code, which when executed by a computer processor enables the computer processor to perform a method for optimizing workflow execution. The method may include receiving an event notification at a service controller of a federated controller of a device ecosystem, wherein the event notification is associated with a workflow deployed in the device ecosystem; performing, by the service controller and based on receiving the event notification, a workflow reconfiguration action comprising: providing a first workflow portion of the workflow and workflow constraints to a first platform controller in a first domain in the device ecosystem; transmitting, by the service controller, a workflow reconfiguration action notification to a second platform controller in a second domain of the device ecosystem; identifying, by the second platform controller and in response to receiving the workflow reconfiguration action notification, a first data transfer optimization action associated with data to be transmitted from the second domain to the first domain and used during execution of the first workflow portion; and transmitting the data from the second domain to the first domain using the first data transfer optimization action.

In general, certain embodiments described herein relate to a system for optimizing workflow execution. The system may include a federated controller for a device ecosystem, the federated controller comprising a plurality of service controllers. The system may also include a service controller of the federated controller, comprising a processor and memory. The service controller may be configured to receive an event notification, wherein the event notification is associated with a workflow deployed in the device ecosystem; perform, based on receiving the event notification, a workflow reconfiguration action comprising providing a first workflow portion of the workflow and workflow constraints to a first platform controller in a first domain in the device ecosystem; and transmit a workflow reconfiguration action notification to a second platform controller in a second domain of the device ecosystem. The system may also include the second platform controller, configured to identify, in response to receiving the workflow reconfiguration action notification, a first data transfer optimization action associated with data to be transmitted from the second domain to the first domain and used during execution of the first workflow portion, wherein the data is transmitted from the second domain to the first domain using the first data transfer optimization action.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
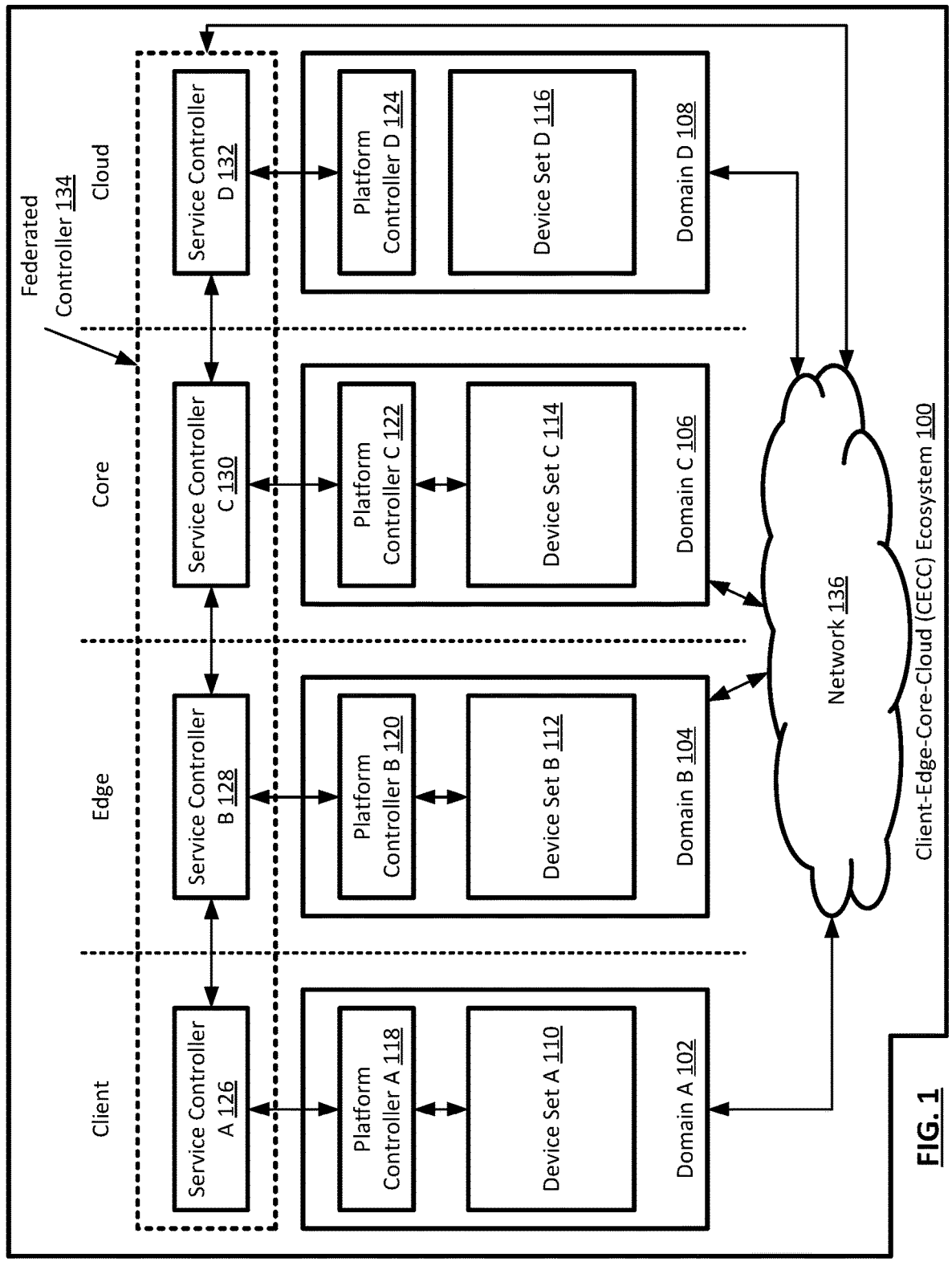
FIG. 1 shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, who also have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for provisioning workflows, or portions thereof, based within device ecosystems, optimizing data transfer between different domains executing workflow portions, and reconfiguring the workflow deployment as needed when certain events occur.

In one or more embodiments, as device ecosystems grow in size and complexity (e.g., from client to edge to core to cloud), connecting more diverse devices generating more data, the need to be able to inventory and characterize the connectivity is required in order to support complex workflows. In one or more embodiments, as the overall application workflow extends within a device ecosystem to capture, process, analyze, or otherwise use data, fitting the services of the application workflow to the capabilities of the various portions of the ecosystem is required. Such fitting may allow for meeting the service level objective (SLO) for the application workflow and the services used in building the workflow, which may be achieved by provisioning work to portions of the ecosystem having necessary capabilities, capacity, and/or data, using mapping relationships between devices. In one or more embodiments, the device ecosystem from client to edge to core to cloud can be mapped into a graph, database, etc., with elements discovered and relationships established and maintained for queries made to determine where one or more portions of a given workflow should be deployed.

Such a graph or database may include ecosystem information in various levels of abstraction. To that end, each portion of a device ecosystem (e.g., client, far edge, near edge, core, cloud, etc.) may have at least one service controller. In one or more embodiments, the services controllers operate collectively as a federated controller for the device ecosystem. Additionally, in one or more embodiments, each domain within a given portion of a device ecosystem may have a platform controller.

In one or more embodiments, the service controllers receive, from platform controllers in their ecosystem portion, capabilities and capacity information, and also receive the same from other service controllers in the federated controller for their respective one or more platform controllers. Such capability and capacity information shared among the service controllers of the federated controller, along with information related to connectivity between different portions of the ecosystem, may be one level of the graph/database of the ecosystem.

In one or more embodiments, each platform controller in an ecosystem obtains and stores more detailed information of the device set of the domain with which it is associated, including, but not limited to, details related to topology, connection bandwidth, processors, memory, storage, data stored in storage, network configuration, domain accelerators (e.g., graphics processing units (GPUs)), deployed operating systems, programs and applications, etc. In one or more embodiments, the more detailed information kept by the various platform controllers represents a different layer of the graph or database of the ecosystem. Thus, in one or more embodiments, the service controllers of the federated controller of an ecosystem have a map of the capabilities and capacity of the various portions of the ecosystem, while the underlying platform controllers have a more detailed map of the actual resources within a given domain device set with which they are associated.

In one or more embodiments, any service controller of the federated controller of an ecosystem may receive a request to execute a workflow (e.g., from a console accessing the service controller). In one or more embodiments, the workflow may be received as or transformed into a directed acyclic graph (DAG). For example, a workflow may be received as a YAML Ain't Markup Language (YAML) file that is a manifest representing a set of interconnected services. In one or more embodiments, the service controller decomposes the DAG into workflow portions, such as services required, data needed, etc. In one or more embodiments, one or more such workflow portions may be identified as an anchor point. In one or more embodiments, the service controller then queries the graph (e.g., by performing a depth first or breadth first search) or database (e.g., using database query techniques) representing the ecosystem to determine what portion of the ecosystem is appropriate for the one or more anchor points (e.g., where the necessary data is or is generated from, where the infrastructure exists to execute a given service, etc.).

In one or more embodiments, once the anchor point has been identified, the service controller may then map it to the appropriate ecosystem portion, and map the other services of the workflow to portions of the ecosystem relative to the anchor point, thereby minimizing the cost of data transfer as much as is possible. In one or more embodiments, the various workflow portions are then provided to platform controllers of the domains to which the workflow portions were mapped, along with any related constraints derived from the workflow or SLO of the workflow, and any other relevant workflow information (e.g., locations of other workflow portions to which data is to be transferred as part of the overall workflow).

In one or more embodiments, upon receiving the workflow portion and constraints from the service controller, a platform controller provisions an appropriate set of devices in the domain for executing the workflow portion. The provisioning may be a first fit on a set of resources in the domain, or may be based on the platform controller having access to information about previous workflow portion executions in the domain that are similar to the workflow portion being deployed.

For example, the platform controller may determine if any similar workflow portion has previously been executed using the device set of the domain managed, at least in part, by the platform controller. In one or more embodiments, if no such previous execution is found, the workflow portion may be deployed as a first fit on a set of resources within a domain. However, if a previous execution exists, the platform controller may obtain information of the subgraph of resources within the domain on which the previous workflow portion was executed. In one or more embodiments, the platform controller will then configure a similar (if not the same) set of resources on which to execute the new workflow portion.

In one or more embodiments, the platform controller also determines if a data transfer optimization action should be used when executing the workflow portion. In one or more embodiments, the platform controller first determines if data generated or otherwise used during execution of the workflow portion is to be transmitted to any other portion of the device ecosystem, such as another domain. In one or more embodiments, if such a data transfer is to occur, the platform controller further determines if any data transfer optimizations should be performed that the devices in the domain are capable of performing Examples of such data transfer optimizations include, but are not limited to, encrypting the data prior to transmission, compressing the data for transmission, transforming the data from one form to another to facilitate the use of the data by another workflow portion after the transmission of the data, etc.

In one or more embodiments, events may occur during the execution of a workflow within a device ecosystem. Examples of such events include, but are not limited to: a mobile ecosystem portion (e.g., a far edge ecosystem portion within a vehicle) changing its proximity (e.g., physical distance, network distance, etc.) relative to some other portion of the device ecosystem; a domain reaching a point of no longer being able to meet SLO expectations when executing a provisioned workflow portion; the economic cost of executing a workflow portion in a particular device ecosystem portion reaching a certain threshold; behaviors and/or actions by an entity in control of an ecosystem portion; devices and/or capacity being added to or removed from a device ecosystem portion; technology changes in or between domains of the device ecosystem (e.g., adoption of 5G communication technologies); a platform controller of a domain of the device ecosystem expressing to a service controller of the federated controller that the domain can perform new capabilities, etc.

In one or more embodiments, such events may trigger a reconfiguration of the workflow within the device ecosystem. Such a reconfiguration may include, but is not limited to: shifting all or any part of a workflow portion from one domain to another domain; adding additional services within the workflow to be executed in a certain domain, reorganizing all or part of workflow portions to be executed in different domains, etc.

In one or more embodiments, reconfiguration of a workflow includes transferring data between domains of a device ecosystem. In one or more embodiments, when such a data transfer is required, the platform controller of a domain whose portion of the workflow requires the data transfer may determine if any data transfer optimization actions may be performed before transferring the data to the other domain. For example, a given workflow may have included a workflow portion in a domain that both obtained data and analyzed the data. In such an example, the devices in the domain may reach a point where they are unable to perform both functions and still meet the SLO of the workflow, thus the platform of the controller of the domain may send an event notification to a service controller with that information. The service controller may then identify another domain that has expressed the required data analysis capability. Accordingly, the data analysis sub-portion of the workflow portion may be shifted to the domain identified by the service controller. To facilitate moving the data analysis part of the workflow, the data, which was previously consumed in the same domain in which it was obtained, must now be transmitted to another domain. Thus, the platform controller of the domain from which the data analysis is being moved may perform a data transfer optimization action for existing and obtained data being sent to the new domain, such as, for example, compressing and encrypting the data, and transforming it to be transmitted efficiently over a network instead of consumed within the domain.

FIG. 1 shows a diagram of a system in accordance with one or more embodiments described herein. The system may include client-edge-core-cloud (CECC) ecosystem (100). CECC ecosystem (100) may include domain A (102), domain B (104) domain C (106) and domain D (108). Domain A (102) may include platform controller A (118) and device set A (110). Domain B (104) may include platform controller B (120) and device set B (112). Domain C (106) may include platform controller C (122) and device set C (114). Domain D (108) may include platform controller D (124) and device set D (116). Domain A (102) may be operatively connected to (or include) service controller A (126). Domain B (104) may be operatively connected to (or include) service controller B (128). Domain C (106) may be operatively connected to (or include) service controller C (130). Domain D (108) may be operatively connected to (or include) service controller D (132). Service controller A (126), service controller B (128), service controller C (130), and service controller D (132) may collectively be federated controller (134). All or any portion of any device or set of devices in CECC ecosystem (100) may be operatively connected to any other device or set of devices via network (136). Each of these components is described below.

In one or more embodiments, CECC ecosystem (100) may be considered a hierarchy of ecosystem portions. In the example embodiment shown in FIG. 1, CECC ecosystem (100) includes a client portion, an edge portion, a core portion, and a cloud portion. However, CECC ecosystem (100) is not limited to the example arrangement shown in FIG. 1. CECC ecosystem (100) may have any number of client portions, each operatively connected to any number of edge portions, which may, in turn, be operatively connected to any number of core portions, which may, in turn, be connected to one or more cloud portions. Additionally, a given CECC ecosystem (100) may have more or less layers without departing from the scope of embodiments described herein. For example, the client portion may be operatively connected to the core portion, or the cloud portion, without an intervening edge portion. As another example, there may be a far edge portion and a near edge portion of ecosystem (100). One of ordinary skill in the art will recognize that there are many possible arrangements of CECC ecosystem (100) other than the example arrangement shown in FIG. 1.

In one or more embodiments, domain A (100) is a portion of CECC ecosystem (100) in the client portion of CECC ecosystem (100). Similarly, domain B (104), domain C (106) and domain D (108) are in the edge portion, the core portion, and the cloud portion, respectively.

In one or more embodiments, domain A (102) includes device set A (110). In one or more embodiments, device set A (110) includes any number of computing devices (not shown). In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a system of such devices. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such computing devices may be operatively connected to other computing devices of device set A (110) in any way, thereby creating any topology of computing devices within device set A (110). In one or more embodiments, one or more computing devices in device set A (110) may be operatively connected to any one or more devices in any other portion of CECC ecosystem (100). Such operative connections may be all or part of a network (136). A network (e.g., network (136)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, although shown separately in FIG. 1, network (136) may include any number of devices within any device set (e.g., 110, 112, 114, 116) of CECC ecosystem (100), as well as devices external to, or between, such portions of CECC ecosystem (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within CECC ecosystem (100), such as, for example, service controllers and/or platform controllers (discussed below).

In one or more embodiments, any or all of the devices in device set A (110) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain (or between domains).

In one or more embodiments, domain A (102) also includes platform controller A (118). In one or more embodiments, platform controller A (112) is any computing device (described above), or any portion of any computing device. In one or more embodiments, platform controller A (118) executes as a service. In one or more embodiments, platform controller A (118) includes functionality to discover details of device set A (110). Such details include, but are not limited to: how devices are connected; what resources a device has (e.g., processors, memory, storage, networking, accelerators, etc.), how much capacity of a device or set of devices is used; what operating systems are executing on devices; how many virtual machines or other virtual computing instances exist; what data exists and where it is located; and/or any other information about devices in device set A (110).

In one or more embodiments, based on the information discovered by platform controller A (118) about device set A (110), platform controller A determines what capabilities device set A (110), or any portion thereof, may perform. In one or more embodiments, a capability is any one or more actions, operations, functionality, stored data, ability to obtain data from any number of data sources, compute resources to perform certain tasks, etc. Examples of capabilities include, but are not limited to, inference, training for machine learning, implementing in-memory databases, having a particular dataset (e.g., video and images from stores of a certain company in a certain region of the country), performing classification, data analysis, etc. Embodiments described herein are not limited to the aforementioned examples. In one or more embodiments, platform controller B (120), platform controller C (122), and platform controller D (124) are also computing devices (described above), and perform functionality similar to that of platform controller A (118) for their respective domains (i.e., domain B (104), domain C (106), and domain D (108)).

In one or more embodiments, each domain (e.g., 102, 104, 106, 108) in CECC ecosystem (100) includes a device set (e.g., 110, 112, 114, 116) and a platform controller (e.g., 118, 120, 122, 124). In one or more embodiments, each device set is a set of computing devices, such as is discussed above in the description of device set A. However, the set of computing devices in different device sets may be different, and may be particular to the portion (e.g., client, edge, cloud, core) of CECC ecosystem (100) that the device set is in. For example, the client portion of CECC ecosystem (100) may include sensors collecting data, controllers controlling the sensors, desktop devices, mobile computing devices, etc. Other data sets may include different computing devices. For example, the edge portion of CECC ecosystem (100) may have a device set that includes servers with more compute ability than devices in the client portion. Similarly, the core portion of CECC ecosystem (100) may include more powerful devices, a greater quantity of more powerful devices, specific architectures of sets of devices for performing certain tasks, etc. Also similarly, the cloud portion of CECC ecosystem (100) may include still more and different devices configured and deployed in different ways that the other portions of CECC ecosystem (100).

Additionally, although not shown in FIG. 1, CECC ecosystem (100) may be arranged in a hierarchy. For example, a single cloud portion may be operatively connected to any number of core portions, each of which may be connected to any number of edge portions, each of which may be connected to any number of client portions. The particular device set (110, 112, 114, 116) in any given portion of CECC ecosystem (100) may determine what capabilities the domain (102, 104, 106, 108) in which the device set exists is suited to perform, which is known to and/or determined by the platform controller for the domain (102, 104, 106, 108).

In one or more embodiments, each platform controller (118, 120, 122, 124) is operatively connected to a respective service controller (126, 128, 130, 132). In one or more embodiments, a service controller (126, 128, 130, 132) is any computing device (described above), or any portion of any computing device. In one or more embodiments, platform controller A (118) executes as a service. Any portion of CECC ecosystem (100) may include any number of service controllers (126, 128, 130, 132), each of which may be operatively connected to any number of platform controllers (118, 120, 122, 124) in any number of domains (102, 104, 106, 108) in a given ecosystem portion (e.g., client, edge, core, cloud). In one or more embodiments, each service controller (126, 128, 130, 132) is also operatively connected to the other service controllers (126, 128, 130, 132) in CECC ecosystem (100). In one or more embodiments, the operatively connected service controllers (126, 128, 130, 132) of CECC ecosystem (100) form federated controller (134) for CECC ecosystem (100).

In one or more embodiments, federated controller (134) functions as a distributed service for deploying workflows within CECC ecosystem (100). In one or more embodiments, any service controller (126, 128, 130, 132) of federated controller (134) may be accessed to request provisioning of a workflow. In one or more embodiments, each service controller (126, 128, 130, 132) receives, from operatively connected platform controllers within the same portion of CECC (100), information about what capabilities underlying device sets of a domain can perform, how much capacity is available on the device set within a given domain (which may be updated on any update schedule), and/or any other information or metadata that may be useful to determine whether a portion of a workflow should be or can be provisioned within a given domain.

In one or more embodiments, each service controller of federated controller (134) also shares the information received from platform controllers with each other service controller of federated controller (134). Collectively, the shared information may be organized as a graph, or database, or any other data construct capable of storing such information, and of being queried to find such information. Such a graph or database may be a distributed data construct shared between the collection of service controllers of federated controller (134).

While FIG. 1 shows a configuration of components, other configurations may be used without departing from the scope of embodiments described herein. Accordingly, embodiments disclosed herein should not be limited to the configuration of components shown in FIG. 1.

Figure 2A:
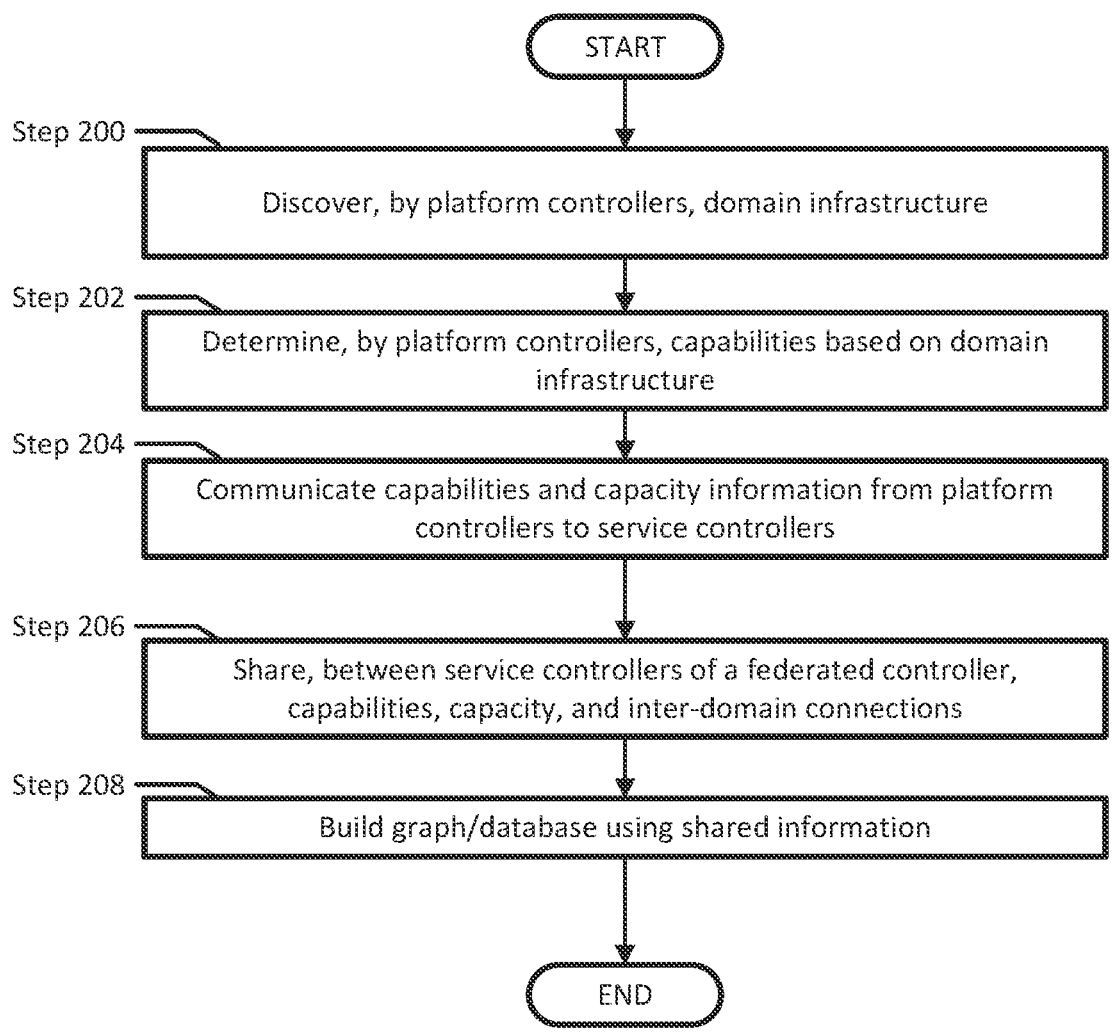
FIG. 2A shows a flowchart in accordance with one or more embodiments of the invention.

FIG. 2A shows a flowchart describing a method for discovering and obtaining information about an ecosystem of devices to be stored in a data construct for future queries when provisioning workflows in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, each platform controller in a given ecosystem discovers information about the device set in the domain in which the platform controller exists. Such information may include the topology of the devices, the computing resources of the devices, configuration details of the devices, operating systems executing on the devices, the existence of any number of virtualized computing device instances, where any number of datasets are stored, how much of the capacity of any one or more devices is being used and/or has available, etc.

In one or more embodiments, any mechanism and/or scheme for discovering such information may be used, and any number of different mechanisms and/or schemes may be used to obtain various types of information. For example, the platform controller may request virtualization infrastructure information from one or more virtualization controllers, determine domain network topology by participating in and/or receiving information shared among domain network devices pursuant to one or more routing protocols, perform queries to determine quantity and type of processors, amount of memory, quantity of GPUs, amount of storage, number of network ports, etc. for servers, determine what type of information is being collected and/or processed by various sensors, controllers, etc., determine where datasets of a particular type or purpose are stored by communicating with one or more storage controllers, etc. Any other form of discovery may be performed by the platform controllers without departing from the scope of embodiments described herein.

In Step 202, based on the information discovered in Step 200, a given platform controller determines what capabilities the device set of a domain has. In one or more embodiments, determination of the capabilities of the device set, or any portion thereof, may be performed in any manner capable of producing one or more capabilities that a given device set, connected and configured in a particular way, may perform. For example, the platform controller may execute a machine learning algorithm that has been trained to identify certain capabilities of a domain set based on the set of information about a device set, or any portion thereof, of a domain.

In Step 204, the capabilities of the domain determined in Step 202 are communicated from the platform controller to an operatively connected service controller, along with information about the currently available capacity of the domain. For example, a platform controller may communicate to a service controller that the domain has the capability to perform inference, to analyze data in a particular way, to train and/or execute certain types of machine learning algorithms, has the sensors to obtain certain types of data, etc. At the same time, the platform controller may also communicate, for example, that currently 27% of the resources of the domain, or any portion therein, are available to perform additional work. In one or more embodiments, the platform controller may also communicate any other information about the domain to the service controller, such as that the domain has (or has sensors to obtain) particular datasets that may be used for a particular purpose (e.g., training a certain type of machine learning algorithm).

In Step 206, each of the service controllers of the federated controller of an ecosystem share the capabilities, capacity, and other information with each other. Sharing information may include sending some or all of the information to the other service controllers, and/or storing the information in a location that is commonly accessible by the service controllers. In one or more embodiments, the service controllers also share information about how the different portions of the ecosystem are operatively connected. For example, the service controllers may use information gained from devices executing a border gateway protocol (BGP) to obtain topology information for the ecosystem.

In Step 208, the federated controller of the ecosystem builds a data construct, such as, for example, a graph or database, using the information communicated from the platform controllers in Step 204 or otherwise obtained and shared in Step 206. In one or more embodiments, the graph or database is stored as a distributed data construct by the service controllers of the federated controller, and may be distributed in any way that a set of information may be divided, so long as it is collectively accessible by each of the service controllers of the federated controller. In one or more embodiments, the graph or database is stored in a form which may be queried to find information therein when determining how and/or where to provision portions of a workflow for which execution is requested. Receiving a request to execute a workflow, querying the graph or database, and provisioning the workflow portions to various domains in the various portions of the ecosystem is discussed further in the description of FIG. 2B, below.

Figure 2B:
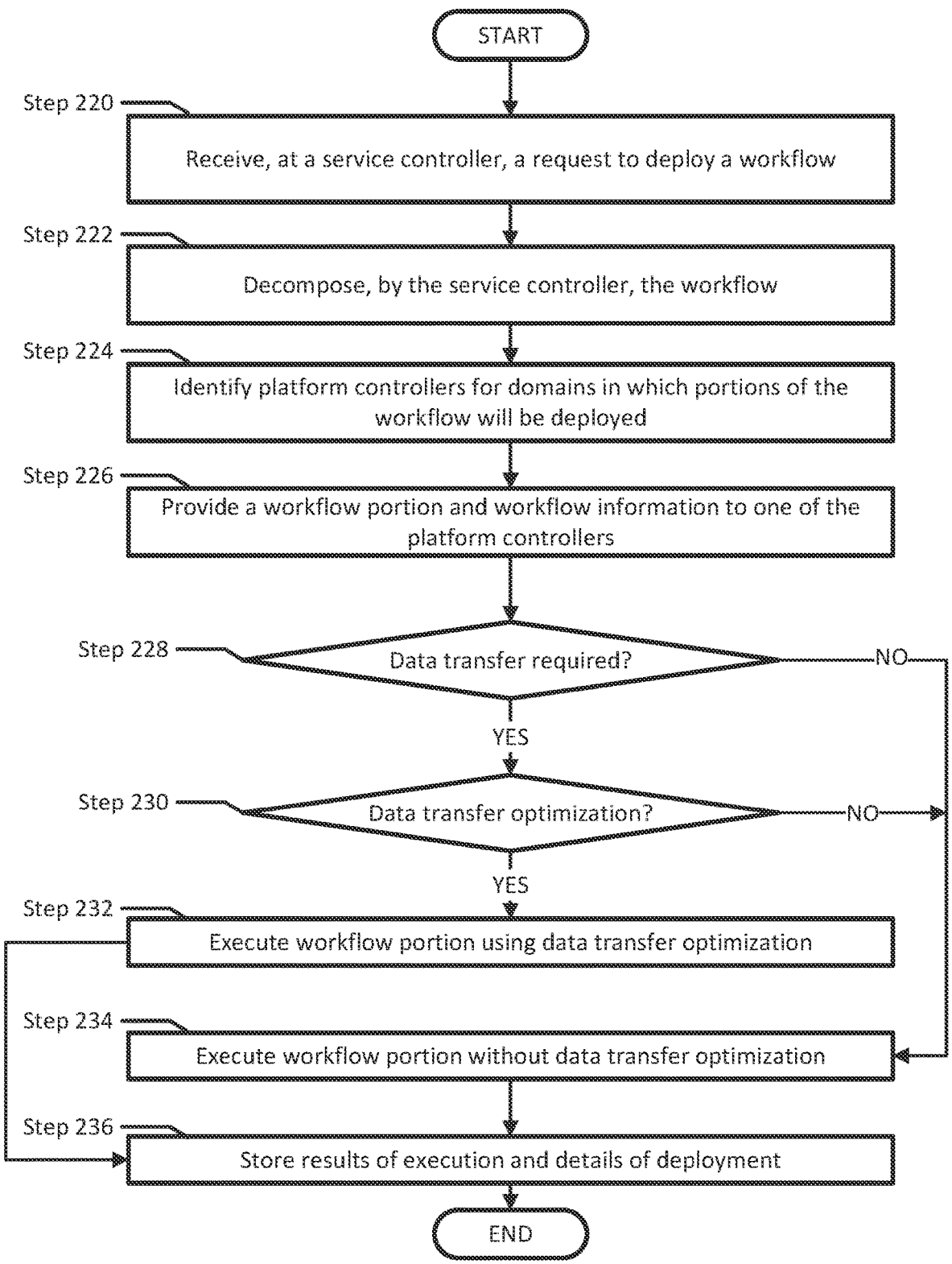
FIG. 2B shows a flowchart in accordance with one or more embodiments of the invention.

FIG. 2B shows a flowchart describing a method for provisioning workflows within a device ecosystem in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a request to deploy a workflow is received at a service controller of a federated controller of a device ecosystem. In one or more embodiments, the request is received in any form that conveys, at least, requirements and constraints for performing the workflow. Constraints may be based, at least in part, on an SLO associated with the workflow, which forms part of an agreement between the entity requesting execution of the workflow and the entity providing the ecosystem in which the workflow will be deployed. Requirements may include that the workflow will require certain amounts or types of compute resources of an ecosystem of devices, require certain data be available and/or obtained, require that certain technologies for data transfer be used (e.g., low latency network solutions), etc. In one or more embodiments, the request is received in a form that can be seen as or converted in to a DAG. For example, the request may be received in the form of a YAML file that is a manifest of the interconnected services of a workflow. The request may be received at a service controller through any form of communicating with a computing device. For example, a user may be provided with access to a cloud console that is configured to access one or more service controllers of a CECC ecosystem.

In Step 222, the service controller decomposes the workflow. In one or more embodiments, decomposing the workflow includes identifying various workflow portions, such as services to be executed, data to be used and/or obtained, etc. In one or more embodiments, decomposing a workflow includes expressing the workflow as a DAG. A given workflow may include any number of workflow portions. As an example, a workflow may be a single service. As another example, a workflow may be any number of services that are in an ordered relationship with any number of interrelated dependencies between them. In one or more embodiments, decomposing a workflow includes identifying one or more anchor points of the workflow. In one or more embodiments, an anchor point is any workflow portion that can be identified as requiring a specific placement within the device ecosystem in which the workflow is to be deployed. As an example, an anchor point may be a particular dataset (e.g., that is needed for training a machine learning algorithm) that is stored in a certain storage location within the ecosystem. As another example, an anchor point may be a particular capability (e.g., inference, certain data analytics, etc.) that a workflow portion requires that may only be performed by domain device sets having particular characteristics. As another example, an anchor point may be the need for data acquired in a specific geographic region. Workflow portions other than the aforementioned examples may be identified as anchor points without departing from the scope of embodiments described herein.

In Step 224, the service controller identifies one or more platform controllers in one or more domains in which the one or more workflow portions will be deployed. In one or more embodiments, the service controller identifies the one or more platform controllers and corresponding domains by performing a query to the data construct generated based on information from the service controller's one or more underlying platform controllers and from the other service controllers of the federated controller, as is discussed above in the description of FIG. 2A. As an example, the capabilities, capacity, and operative connectivity of the various domains in the ecosystem may be organized as a graph, and the service controller may perform a breadth first or depth first search using the graph information structure. As another example, the capabilities, capacity, and operative connectivity of the various domains in the ecosystem may be organized as a database, and the service controller may perform a database query to find the information.

In one or more embodiments, the service controller first identifies where to deploy any anchor points identified in Step 222. Determining a domain in which an anchor point will be deployed may influence all or any portion of the deployment locations within the ecosystem for the other workflow portions identified in Step 222. In one or more embodiments, this is because the service controller may attempt to minimize the burden of data transfer within the ecosystem by placing the additional workflow portions in optimal locations relative to the placement of the anchor point workflow portion. For example, if the ecosystem includes a far edge portion where image data is being acquired at a certain physical location, a workflow portion for analyzing that data, at least in part, may be placed at a near edge portion of the ecosystem that is in relatively close physical proximity to the far edge portion, which may minimize the transmission times for the image data being obtained. In one or more embodiments, the service controller identifies domains in which to execute all portions of the decomposed workflow.

In Step 226, the service controller provides the workflow portions and related constraints (e.g., constraints derived from the SLO corresponding to the workflow) and other relevant information (e.g., the identity of devices in other domains to which data is to be transferred during execution of the workflow) to the platform controllers identified in Step 224. In one or more embodiments, the workflow portion, constraints, and other information are provided directly to the platform controller(s) that are in the same ecosystem portion as the service controller. In one or more embodiments, other workflow portions and corresponding constraints are provided to the relevant platform indirectly (e.g., by way of the service controller in the ecosystem portion that the platform controller exists in). In one or more embodiments, the workflow portion and any corresponding constraints are provided to the platform controllers using any appropriate method of data transmission. As an example, the service controller may communicate the workflow portion details, corresponding constraints, and related information as network data traffic units over a series of network devices that operatively connect the service controller and the relevant platform controller.

In Step 228, a platform controller that receives a workflow portion makes a determination as to whether executing the workflow portion requires transferring data to another workflow portion being executed in another domain of the device ecosystem. Such a determination may be made, for example, when the platform controller assesses the information related to the workflow portion provided by the service controller. In one or more embodiments, if no such data transfer is required, the method proceeds to Step 234. In one or more embodiments, if such a data transfer is required, the method proceeds to Step 230.

In Step 230, a determination is made, by the platform controller, as to whether a data transfer optimization action may be performed. In one or more embodiments, a data transfer optimization action is any one or more operations that can be performed on any data to optimize and/or otherwise facilitate the transfer of data to another domain in a device ecosystem.

In one or more embodiments, a data transformation action may optimize or facilitate the actual transfer of the data between domains, and/or the use of the data by the receiving domain. Examples of data transfer optimization action may include, but are not limited to, compression, deduplication, encryption, data realignment for different types of central processing units (CPUs), graphics processing units (GPUs), etc., and any other data transformation without departing from the scope of embodiments described herein. In one or more embodiments, determining whether a data transfer optimization action may be performed includes, at least, determining whether such a data transfer optimization action is necessary for the data transfer (e.g., the receiving domain uses a different CPU architecture, the bandwidth between domains is limited, etc.), as well as whether the device set of the domain includes the requisite capabilities to perform the data transfer optimization action.

In one or more embodiments, if one or more data transfer optimization actions are to be performed, the method proceeds to Step 232. In one or more embodiments, if no data transfer optimization actions are to be performed, the method proceeds to Step 234.

In Step 232, based on the determination in Step 228 that data transfer to another domain is required, and the determination in Step 230 that one or more data transfer optimization actions are to be performed when transferring the data, the workflow portion is executed within the domain, and the one or more data transfer optimization actions are performed on data being transferred to a different domain.

In Step 234, based on a determination that no data transfer is required, or that no data transfer optimizations will be performed, the platform controller provisions devices to perform the workflow portion on available resources of the device set of the domain without any data transfer optimization actions.

In Step 236, the results of the execution and the details of the deployment are stored by the platform controller in any storage location accessible to the platform controller. In one or more embodiments, the storing includes classifying the workflow portion that was executed, storing the details of the devices and configuration of the infrastructure within the domain on which the execution occurred, storing any data transfer optimization actions that were performed for the workflow portion, and whether or not the execution of the workflow portion was successful.

Figure 2C:
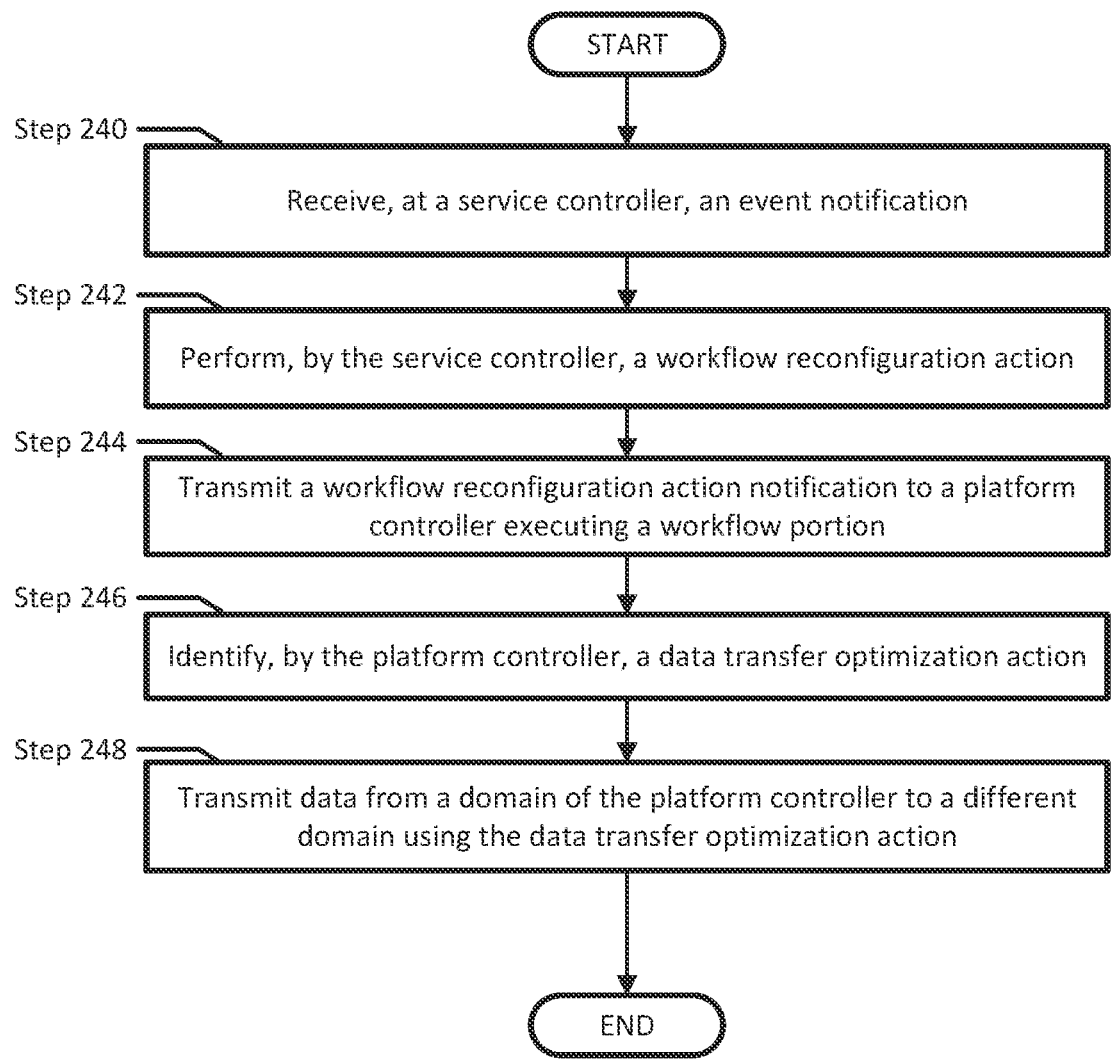
FIG. 2C shows a flowchart in accordance with one or more embodiments of the invention.

FIG. 2C shows a flowchart describing a method for provisioning workflows within a device ecosystem in accordance with one or more embodiments disclosed herein.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 240, a service controller receives an event notification. In one or more embodiments, an event notification is received from a platform controller in the device ecosystem. In one or more embodiments, an event notification is received from another service controller of the federated controller of a device ecosystem. In one or more embodiments, an event notification is generated by the service controller receiving the notification. In one or more embodiments, an event notification is received based on the occurrence of an event in the device ecosystem. Examples of such events include, but are not limited to: a mobile ecosystem portion (e.g., a far edge ecosystem portion within a vehicle) changing its proximity (e.g., physical distance, network distance, etc.) relative to some other portion of the device ecosystem; a domain reaching a point of no longer being able to meet SLO expectations when executing a provisioned workflow portion; the economic cost of executing a workflow portion in a particular device ecosystem portion reaching a certain threshold; behaviors and/or actions by an entity in control of an ecosystem portion (e.g., social or political actions taken by a particular cloud provider); devices and/or capacity being added to or removed from a device ecosystem portion; technology changes in or between domains of the device ecosystem (e.g., adoption of 5G communication technologies); a platform controller of a domain of the device ecosystem expressing to a service controller of the federated controller that the domain can perform new capabilities, etc. An event notification may be received by a service controller in any form that information may be received. As an example, a platform controller of a domain that is no longer able to meet the SLO for a workflow portion may send an alert message to a service controller.

In Step 242, the service controller, in response to receiving the event notification, performs a workflow reconfiguration action. Examples of workflow reconfiguration actions include, but are not limited to: shifting all or any part of a workflow portion from one domain to another domain; adding additional services within the workflow to be executed in a certain domain, reorganizing all or part of workflow portions to be executed in different domains, etc.

As an example, a service controller of a near edge portion of a device ecosystem located in a particular city may offer a set of services related to navigating the city (e.g., current construction maps, parking maps, traffic conditions, etc.). Such a service controller may receive an event notification that a new vehicle (i.e., a far edge portion of the device ecosystem) has entered the city in range of the communication ability of the service controller. In such a scenario, the workflow configuration action performed by the service controller may be determine that the additional services offered by the near edge ecosystem portion to which it is operatively connected should be made available to the vehicle that triggered the event notification.

As another example, a service controller may receive an event notification from a platform controller that it is no longer capable of successfully performing the entirety of a previously provisioned workflow portion. Such a service controller may then, as part of a workflow reconfiguration action, identify one or more platform controllers of other domains in the device ecosystem that have expressed capabilities and capacity to perform all or any portion of the workflow portion (see, e.g., the description of Step 224, above), to which all or any part of the workflow portion may be transitioned.

As another example, a service controller may receive an event notification from an administrator that the amount of data being processed in a cloud portion of a device ecosystem owned by a cloud provider has reached a threshold (e.g., from petabytes to exabytes) such that the cost of processing the data is too high, and the entity that owns the data wishes to reduce cost. Such a service controller may then, as part of a workflow reconfiguration action, identify one or more platform controllers in one or more domains of one or more portions of the device ecosystem owned by the entity that owns the data and that have expressed the capability and capacity to perform the data processing, to which all or any part of the data processing may be transitioned in order to reduce the cost of executing the workflow.

In Step 244, after performing the workflow reconfiguration action of Step 242, the service controller may send a workflow reconfiguration action notification to a platform controller of the device ecosystem that is executing a workflow portion of the workflow, and that will be required to transfer data to a different domain of the device ecosystem to facilitate the workflow reconfiguration action. The transmission of workflow reconfiguration action notification may be performed using any scheme for transmitting information from a service controller to a platform controller.

In Step 246, in response to receiving the workflow reconfiguration action notification, the platform controller identifies a data transfer optimization action that may be performed as part of transferring data to another domain in the device ecosystem to facilitate the workflow reconfiguration action. In one or more embodiments, a data transformation action may optimize or facilitate the actual transfer of the data between domains, and/or the use of the data by the receiving domain. Examples of data transfer optimization action may include, but are not limited to, compression, deduplication, encryption, data realignment for different types of central processing units (CPUs), graphics processing units (GPUs), etc. Any other type of data transformation may be part of a data transfer optimization action without departing from the scope of embodiments described herein. In one or more embodiments, identifying a data transfer optimization action to be performed includes, at least, determining whether such a data transfer optimization action is necessary for the data transfer (e.g., the receiving domain uses a different CPU architecture, the bandwidth between domains is limited, etc.), as well as whether the device set of the domain includes the requisite capabilities to perform the data transfer optimization action.

In Step 248, data from the domain that includes the platform controller that received the workflow reconfiguration action notification in Step 244 is transferred to another domain in the device ecosystem to facilitate the workflow reconfiguration. In one or more embodiments, the data transfer is performed using the one or more data transfer optimization actions identified in Step 246.

Figure 3:
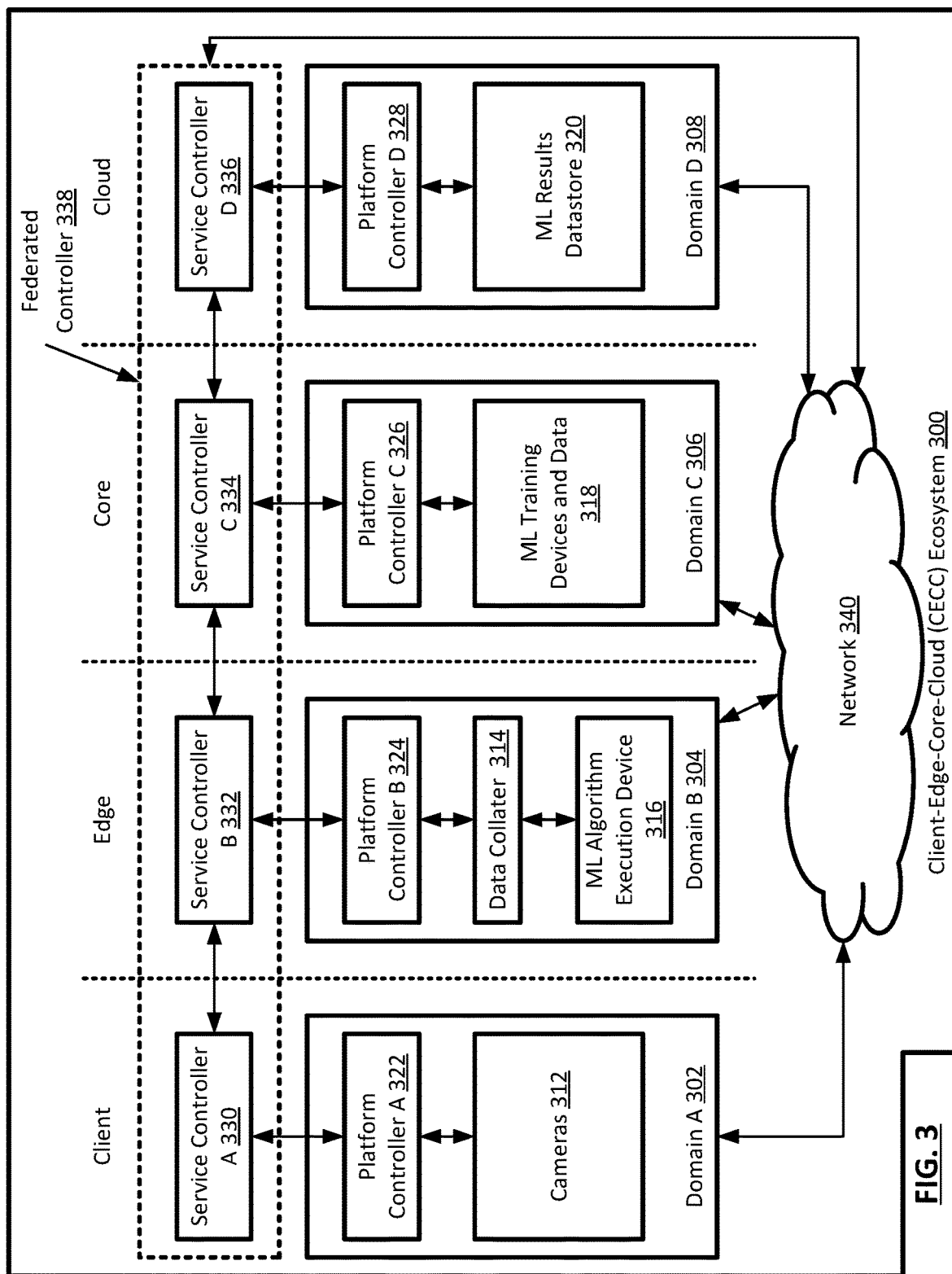
FIG. 3 shows an example in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein. One of ordinary skill will appreciate that in a real-world use of embodiments described herein, a device ecosystem may be organized and interconnected in any manner, and that any number of different workflows to achieve any number of different results may be deployed in such an ecosystem of devices.

Referring to FIG. 3, consider a scenario in which a retail store has cameras deployed in the store on mobile robots to monitor inventory levels of items to be sold in the store. Based on the images, the store wants to have orders placed when inventory of the monitored items drops to a certain level, and wants to use the image data obtained by the robots to trigger the orders. To achieve this goal, the store needs a machine learning algorithm that has been trained to recognize when images of the inventory indicate that the inventory has reached the point of triggering the orders, and that has the ability to execute the trained algorithm using the images obtained by the cameras on the robots.

In such a scenario, the store will utilize CECC ecosystem (300), which includes domain A (302) in a client portion of the ecosystem, domain B (304) in an edge portion of the ecosystem, domain C (306) in a core portion of the ecosystem, and domain D (308) in a cloud portion of the ecosystem. Domain A (302) includes platform controller A (320) and cameras (312). Domain B (304) includes platform controller B (324), data collator (314), and machine learning (ML) execution device A (316). Domain C (306) includes platform controller C (326), ML training devices and data (318), and ML execution device B (342). Domain D (308) includes platform controller D (328) and ML results datastore (320). Domain A (302) is operatively connected to service controller A (330). Domain B (304) is operatively connected to service controller B (332). Domain C (306) is operatively connected to service controller C (334). Domain D (308) is operatively connected to service controller D (336). Service controller A (330), service controller B (332), service controller C (334), and service controller D (336) collectively are federated controller (338). All or any portion of any device or set of devices in CECC ecosystem (300) may be operatively connected to any other device or set of devices via network (340).

The client portion of the ecosystem exists in the store as cameras (312) on the robots, and the associated computing devices for capturing the inventory images. The edge portion of the ecosystem also exists at the store, and includes computing devices for collating the data (i.e., data collator (314)) and computing devices for executing the trained ML algorithm (i.e., ML algorithm execution device A (316)). The store is part of a national chain that has a number of data centers across the country that collectively make up the core portion of the store chain's device ecosystem. Domain C (306) is in a data center of the core portion that is located in the same region as the store. The cloud portion of the ecosystem is used for storing information relevant to the chain of stores, and for historical purposes, as well as being the location from which all orders for the store chain are made.

When the store seeks to implement the new inventory management scheme, it submits the workflow as a YAML file to service controller A (330), which is implemented on a server located at the store and accessed via a console from a computer of the store manager. Service controller A (330) converts the YAML file into a DAG. In the DAG, the image data must be obtained from the cameras (312) at the store, the ML algorithm must be trained using image data the store owns. The trained ML algorithm must be provided to the ML algorithm execution device A (316) located in the edge portion of the ecosystem that is also at the store. The image data from the cameras (312) must be collated and provided to ML algorithm execution device A (316). Finally, the results of executing the ML algorithm based on the image data must be stored in the cloud so that the required items may be ordered.

Service controller A (330) decomposes the DAG, and identifies the image acquisition from the cameras in the store as the anchor point. Service controller A then performs a search of a previously constructed graph of capabilities and capacity of the various domains in the ecosystem, and identifies domain A (302) as including the relevant cameras (312). Domain A (302) and the cameras (312) therein thus become the anchor point for the workflow. Service controller A (330) continues the search based on the anchor point, by searching within portions of the ecosystem in the same region of the country as the location of the store, and identifies that domain B (304), which is located at the same store, has expressed through platform controller B (324) and service controller B (332) that it has the capability to perform data collation services, and that it also has the capability to execute ML algorithms. Accordingly, service controller A assigns the data collation and ML algorithm execution portions of the workflow to platform controller B (324). Service controller A (330) also determines that platform controller C (326) has expressed by way of service controller C (334) that domain C (306) has image data for training the relevant ML algorithm, and the computing resources to perform the training. Service controller A (330) then determines, by way of service controller D (336), that domain D (308) has the capability of storing ML algorithm execution results, and making orders of items needed for store inventories.

Based on the above results gained from searching within the graph structure maintained by the service controllers of federated controller (338), service controller A (330) provides the various workflow portions to the appropriate platform controllers to perform the workflow portions.

Once assigned, platform controller A (322) deploys the data acquisition portion of the workflow on the cameras (312) of the robots in the store. Additionally, platform controller A (322) identifies that, as part of performing its workflow portion, data generated by cameras (312) will be transmitted to domain B (304). Based on this determination, platform controller A (322) further determines that devices within domain A (302) are capable of performing data compression, which is a data transfer optimization action that will expedite execution of the overall workflow by compressing the camera data before sending it to domain B (304). Therefore, platform controller A (322) provisions the necessary devices to perform the compression, which then perform the data transfer optimization action as the workflow portion in domain A (302) is being performed.

Platform controller B determines that it has previously performed image data collation using a particular set of devices in domain B (304), and that the service was performed successfully. Accordingly, platform controller B (324) provisions data collator (314) to perform the service. Platform controller B (324) also performs a subgraph similarity check and determines that execution of a similar ML algorithm has previous been performed successfully in domain B (304). However, the resources used to perform the previous workflow portion are not available. Therefore, platform controller B provisions a similar set of devices in a similar way to perform the same tasks, as ML execution device A (316).

Platform controller C (326) determines that domain C (306) has previously performed ML training on an image training data set, using a set of devices that currently have capacity to perform additional work. Accordingly, platform controller C (326) provisions the set of devices to perform this new workflow portion of ML training and connects the devices to the appropriate training data set to use during the training. The devices and data are shown collectively in FIG. 3 as ML training devices and data (318).

Platform controller D (328) determines that domain D (308) includes the appropriate data store for storing ML results (i.e., ML results datastore (320)), and the capability to make orders based on results stored therein. Accordingly, platform controller D (328) provisions storage within datastore (320) to store the results of the execution of the ML algorithm.

As the various workflow portions get deployed in the appropriate locations in the ecosystem, execution begins. First, the ML algorithm is trained using the store chains existing labeled image data in ML training devices and data (318) of domain C (306). Once the algorithm is sufficiently trained, the trained algorithm is provided over network (340) to ML algorithm execution device A (316) of domain B (304). At that point, cameras (312) in domain A (302) begin capturing images of the inventory in the store room as the robots move up and down the aisles. The images are transmitted to data collator (314), which collates the images and provides them to ML algorithm execution device A (316). ML algorithm execution device A (316) then executes the ML algorithm using the images to determine if items need to be ordered. The results are then sent to the ML results datastore (320) of domain D (308). An ordering module (not shown) also in domain D (308) accesses the results, and places the necessary orders.

Sometime later, due to a combination of having been tasked with performing additional workflow portions of other workflows, and the failure of several servers, platform controller B (324) determines that it is no longer able to successfully perform the ML execution portion of the workflow. Therefore, platform controller B (324) sends an event notification to service controller B (332). In response, service controller B, as part of a workflow reconfiguration action, searches within the graph structure maintained by the service controllers of federated controller (338), and identifies that platform controller C (326) has expressed that domain C (306) has the capability to perform the ML execution portion of the workflow. Based on the identification, service controller B (332), also as part of the workflow reconfiguration action, provides the ML execution workflow portion and related information to platform controller C (326), which provisions ML execution device B (342) to perform the workflow portion.

As another part of the workflow reconfiguration action, service controller B (332) sends a workflow reconfiguration action notification to platform controller B (324), indicating that the ML execution workflow portion will now be performed in domain C (306) by ML execution device B (342). In response, platform controller B (324) identifies that domain C (306), unlike domain A (302) and domain B (304), is located in the core at a site that is not within the store. As such, the image data that now must be sent to ML execution device B (342) from data collator (314) must be encrypted as a data transfer optimization action. Accordingly, platform controller B (324) provisions devices within domain B (304) to perform the encryption, and the data transfer optimization action of encryption is performed as data is transferred to domain C (306).

In the above example, the graph construct representing the capabilities and capacity of the various domains was used to quickly and automatically determine where to place workflow portions based on the requirements, constraints, and capabilities learned by decomposing the DAG of the workflow. Once the workflow portions were provided to the platform controllers, the platform controllers were able to determine that data transfer optimization actions could be used to optimize data transfer between domains. Later, when an event occurred (i.e., domain B no longer being able to perform the ML execution portion of the workflow), an event notification received by a service controller triggered a workflow reconfiguration action, and a workflow portion was moved across the boundary between the edge and the core in order to continue to successfully execute the workflow. As part of moving the workflow portion, an additional data transfer optimization action (i.e., encryption) was identified and performed as part of transitioning the workflow portion to another domain.

Figure 4:
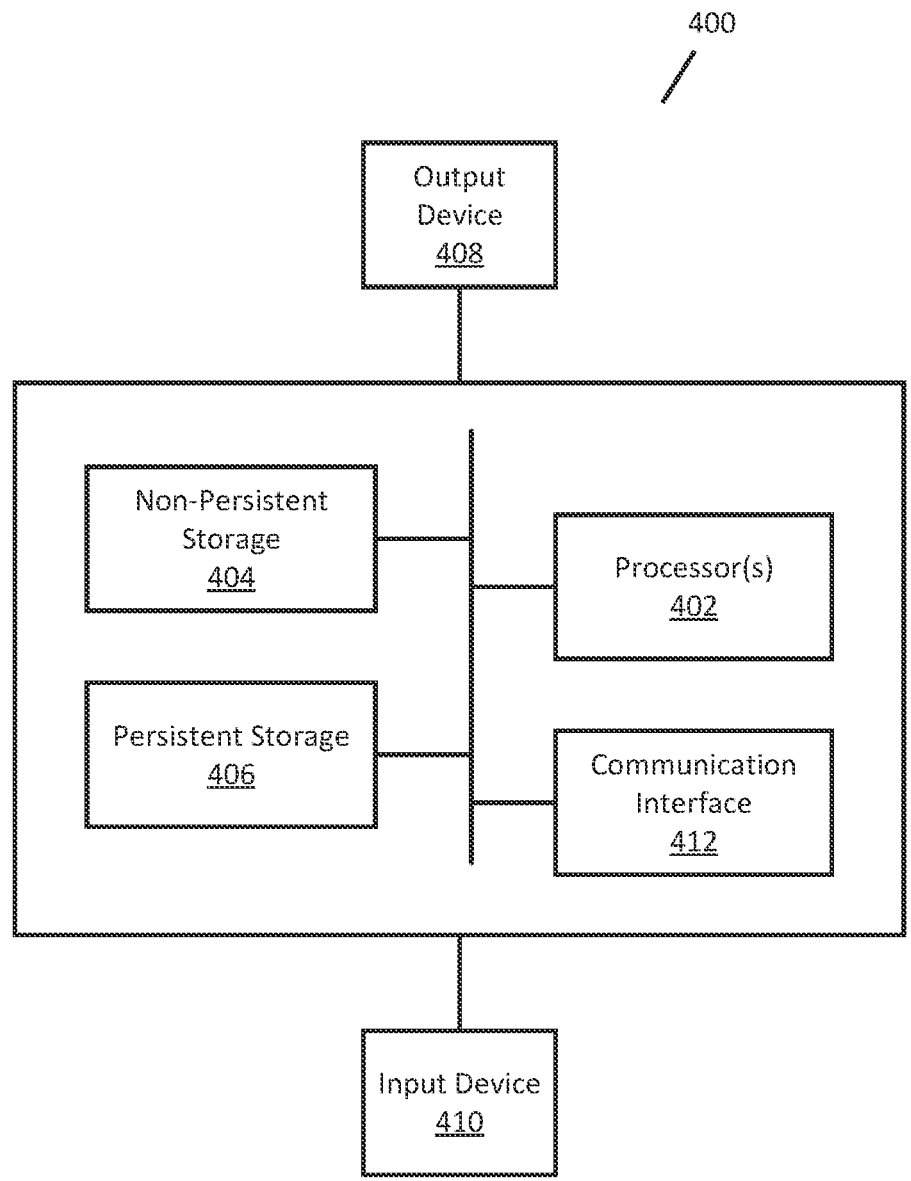
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein use several layers of a graph or database as a mechanism to manage the ecosystem at scale using algorithms and techniques for searching and querying in order to deploy workflow portions within a device ecosystem. Platform controllers may then perform data transfer optimization actions when data is to be transferred between domains. When events occur, service controllers are able to reconfigure the workflow as needed, and platform controllers perform additional data transfer optimization actions to facilitate, at least in part, the reconfiguration of the workflow so that, for example, the SLO of the workflow continues to be met.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for optimizing workflow execution, the method comprising:
   receiving an event notification at a service controller of a federated controller of a device ecosystem, wherein the event notification is associated with a workflow deployed in the device ecosystem;
   performing, by the service controller and based on receiving the event notification, a workflow reconfiguration action comprising:
      providing a first workflow portion of the workflow and workflow constraints to a first platform controller in a first domain in the device ecosystem;
      transmitting, by the service controller, a workflow reconfiguration action notification to a second platform controller in a second domain of the device ecosystem;
      identifying, by the second platform controller and in response to receiving the workflow reconfiguration action notification, a first data transfer optimization action associated with data to be transmitted from the second domain to the first domain and used during execution of the first workflow portion; and
   transmitting the data from the second domain to the first domain using the first data transfer optimization action.

2. The method of claim 1, further comprising, before receiving the event notification:
   receiving, at the service controller, a request to deploy the workflow in the device ecosystem;
   decomposing, by the service controller, the workflow into a plurality of workflow portions comprising a second workflow portion;
   performing, by the service controller, a search in a capabilities and constraints data construct to identify a domain in which to perform a second workflow portion, wherein the identified domain is the second domain; and
   providing the second workflow portion and workflow connection information to the second platform controller in the second domain.

3. The method of claim 2, further comprising:
   identifying, by the second platform controller and based on the workflow connection information, a second data transfer optimization action associated with second data to be transmitted from the second domain to a third domain during execution of the second workflow portion; and
   executing the second workflow portion in the second domain using the second data transfer optimization action.

4. The method of claim 1, wherein the workflow reconfiguration action further comprises adding the first workflow portion to the workflow as a new workflow portion.

5. The method of claim 1, wherein the workflow reconfiguration action further comprises:
   identifying, by the service controller, a sub-portion of a second workflow portion that the second domain is no longer capable of executing; and
   shifting the sub-portion from the second domain to the first domain as the first workflow portion.

6. The method of claim 1, wherein the event notification comprises a new capability expressed by the first platform controller for the first domain.

7. The method of claim 1, wherein the first data transfer optimization action comprises at least one selected from a group consisting of compression, encryption, and data re-formatting.

8. A non-transitory computer readable medium comprising computer readable program code, which when executed by a computer processor enables the computer processor to perform a method for optimizing workflow execution, the method comprising:
   receiving an event notification at a service controller of a federated controller of a device ecosystem, wherein the event notification is associated with a workflow deployed in the device ecosystem;
   performing, by the service controller and based on receiving the event notification, a workflow reconfiguration action comprising:

providing a first workflow portion of the workflow and workflow constraints to a first platform controller in a first domain in the device ecosystem;
transmitting, by the service controller, a workflow reconfiguration action notification to a second platform controller in a second domain of the device ecosystem;
identifying, by the second platform controller and in response to receiving the workflow reconfiguration action notification, a first data transfer optimization action associated with data to be transmitted from the second domain to the first domain and used during execution of the first workflow portion; and
transmitting the data from the second domain to the first domain using the first data transfer optimization action.

9. The non-transitory computer readable medium of claim 8, wherein the method performed by executing the computer readable program code further comprises, before receiving the event notification:
receiving, at the service controller, a request to deploy the workflow in the device ecosystem;
decomposing, by the service controller, the workflow into a plurality of workflow portions comprising a second workflow portion;
performing, by the service controller, a search in a capabilities and constraints data construct to identify a domain in which to perform a second workflow portion, wherein the identified domain is the second domain; and
providing the second workflow portion and workflow connection information to the second platform controller in the second domain.

10. The non-transitory computer readable medium of claim 9, wherein the method performed by executing the computer readable program code further comprises:
identifying, by the second platform controller and based on the workflow connection information, a second data transfer optimization action associated with second data to be transmitted from the second domain to a third domain during execution of the second workflow portion; and
executing the second workflow portion in the second domain using the second data transfer optimization action.

11. The non-transitory computer readable medium of claim 8, wherein the workflow reconfiguration action further comprises adding the first workflow portion to the workflow as a new workflow portion.

12. The non-transitory computer readable medium of claim 8, wherein the workflow reconfiguration action further comprises:
identifying, by the service controller, a sub-portion of a second workflow portion that the second domain is no longer capable of executing; and
shifting the sub-portion from the second domain to the first domain as the first workflow portion.

13. The non-transitory computer readable medium of claim 8, wherein the event notification comprises a new capability expressed by the first platform controller for the first domain.

14. The non-transitory computer readable medium of claim 8, wherein the first data transfer optimization action comprises at least one selected from a group consisting of compression, encryption, and data re-formatting.

15. A system for optimizing workflow execution, the system comprising:
a federated controller for a device ecosystem, the federated controller comprising a plurality of service controllers;
a service controller of the federated controller, comprising a processor and memory, and configured to:
receive an event notification, wherein the event notification is associated with a workflow deployed in the device ecosystem;
perform, based on receiving the event notification, a workflow reconfiguration action comprising:
providing a first workflow portion of the workflow and workflow constraints to a first platform controller in a first domain in the device ecosystem; and
transmit a workflow reconfiguration action notification to a second platform controller in a second domain of the device ecosystem; and
the second platform controller, configured to identify, in response to receiving the workflow reconfiguration action notification, a first data transfer optimization action associated with data to be transmitted from the second domain to the first domain and used during execution of the first workflow portion,
wherein the data is transmitted from the second domain to the first domain using the first data transfer optimization action.

16. The system of claim 15, wherein:
the service controller is further configured to, before receiving the event notification:
receive a request to deploy the workflow in the device ecosystem;
decompose the workflow into a plurality of workflow portions comprising a second workflow portion;
perform a search in a capabilities and constraints data construct to identify a domain in which to perform a second workflow portion, wherein the identified domain is the second domain; and
provide the second workflow portion and workflow connection information to the second platform controller in the second domain; and
the second platform controller is further configured to:
identify, based on the workflow connection information, a second data transfer optimization action associated with second data to be transmitted from the second domain to a third domain during execution of the second workflow portion,
wherein the second workflow portion is executed in the second domain using the second data transfer optimization action.

17. The system of claim 15, wherein the workflow reconfiguration action further comprises adding the first workflow portion to the workflow as a new workflow portion.

18. The system of claim 15, wherein the workflow reconfiguration action further comprises:
identifying, by the service controller, a sub-portion of a second workflow portion that the second domain is no longer capable of executing; and
shifting the sub-portion from the second domain to the first domain as the first workflow portion.

19. The system of claim 15, wherein the event notification comprises a new capability expressed by the first platform controller for the first domain.

20. The system of claim 15, wherein the first data transfer optimization action comprises at least one selected from a group consisting of compression, encryption, and data re-formatting.

* * * * *